(12) United States Patent
Sutton

(10) Patent No.: US 11,319,933 B2
(45) Date of Patent: May 3, 2022

(54) ROTOR BLADE FOR A WIND TURBINE INCORPORATING A LIGHTNING PROTECTION SYSTEM

(71) Applicant: Vestas Wind Systems A/S, Aarhus N. (DK)

(72) Inventor: Chris Sutton, Romsey (GB)

(73) Assignee: Vestas Wind Systems A/S, Aarhus N. (DK)

( * ) Notice: Subject to any disclaimer, the term of this patent is extended or adjusted under 35 U.S.C. 154(b) by 101 days.

(21) Appl. No.: 16/646,589

(22) PCT Filed: Sep. 7, 2018

(86) PCT No.: PCT/DK2018/050223
§ 371 (c)(1),
(2) Date: Mar. 12, 2020

(87) PCT Pub. No.: WO2019/052616
PCT Pub. Date: Mar. 21, 2019

(65) Prior Publication Data
US 2020/0271105 A1  Aug. 27, 2020

(30) Foreign Application Priority Data

Sep. 12, 2017  (DK) ............................ PA 2017 70687

(51) Int. Cl.
*F03D 80/30*  (2016.01)
*B29C 65/48*  (2006.01)
(Continued)

(52) U.S. Cl.
CPC .............. *F03D 80/30* (2016.05); *B29C 65/48* (2013.01); *B29C 66/54* (2013.01); *F03D 1/0675* (2013.01);
(Continued)

(58) Field of Classification Search
CPC ....... F03D 80/30; F03D 1/0675; H02G 13/40; H02G 13/80; B64D 45/02
See application file for complete search history.

(56) References Cited

U.S. PATENT DOCUMENTS

2011/0008175 A1* 1/2011 Gau .................... B29C 65/5085
416/233
2014/0341738 A1* 11/2014 Bech ....................... F03D 80/30
416/146 R
(Continued)

FOREIGN PATENT DOCUMENTS

CN  201991708 U  9/2011
DE  102013107296 A1  1/2015
(Continued)

OTHER PUBLICATIONS

NPL Curbell, "LDPE", Jul. 3, 2017, Curbell Plastics. (Year: 2017).*
(Continued)

*Primary Examiner* — Woody A Lee, Jr.
*Assistant Examiner* — Wesley Le Fisher
(74) *Attorney, Agent, or Firm* — Wood Herron & Evans LLP

(57) ABSTRACT

A rotor blade for a wind turbine comprising: an internal blade cavity defined by two opposing internal surfaces of two shells of the rotor blade; a receptor block forming part of a lightning protection system and disposed within the internal blade cavity; and a centralising device that spaces the receptor block from the two opposing internal surfaces of the shells such that the receptor block lies centrally within the internal blade cavity. The receptor block is therefore in a desired position for installing receptors for lightning discharge.

16 Claims, 5 Drawing Sheets

(51) Int. Cl.
    *B29C 65/00*      (2006.01)
    *F03D 1/06*      (2006.01)

(52) U.S. Cl.
    CPC ... *F05B 2240/221* (2013.01); *F05B 2240/301* (2013.01); *F05B 2240/311* (2013.01); *F05B 2280/6012* (2013.01)

(56) References Cited

U.S. PATENT DOCUMENTS

| | | | | |
|---|---|---|---|---|
| 2016/0258423 | A1* | 9/2016 | Whitehouse | F03D 80/30 |
| 2016/0348652 | A1* | 12/2016 | March Nomen | F03D 80/30 |
| 2017/0321661 | A1* | 11/2017 | Mieritz | F03D 80/30 |
| 2018/0223796 | A1* | 8/2018 | Yarbrough | F03D 1/0675 |

FOREIGN PATENT DOCUMENTS

| | | |
|---|---|---|
| EP | 2110552 A1 | 10/2009 |
| EP | 2816227 A1 | 12/2014 |
| GB | 2519332 A | 4/2015 |
| WO | 2013084370 A1 | 6/2013 |
| WO | 2015055214 A1 | 4/2015 |
| WO | WO-2015055215 A1 * 4/2015 ......... H01B 13/0036 |
| WO | 2016074677 A1 | 5/2016 |
| WO | 2016185753 A1 | 11/2016 |

OTHER PUBLICATIONS

European Patent Office, Examination Report in EP 18772728.4, dated Mar. 22, 2021.

Danish Patent and Trademark Office, Search and Examination Report in PA 2017 70687, dated Feb. 16, 2018.

European Patent Office, International Search Report and Written Opinion in PCT Application No. PCT/DK2018/050223, dated Dec. 3, 2018.

* cited by examiner

ROTOR BLADE FOR A WIND TURBINE INCORPORATING A LIGHTNING PROTECTION SYSTEM

TECHNICAL FIELD

This invention relates to a rotor blade for a wind turbine and a wind turbine. The rotor blade and wind turbine described herein incorporate a lightning protection system comprising a lightning receptor assembly disposed centrally within an internal blade cavity formed by a shell of the rotor blade.

BACKGROUND

Wind turbines are vulnerable to being struck by lightning; sometimes on the tower, nacelle and the rotor hub, but most commonly on the blades of the turbine. A lightning strike event has the potential to cause physical damage to the turbine blades and also electrical damage to the internal control systems of the wind turbine. Wind turbines are often installed in wide open spaces which makes lightning strikes a common occurrence. Accordingly, in recent years much effort has been made by wind turbine manufacturers to design wind turbines so that they are able to manage effectively the energy imparted to them during a lightning strike in order to avoid damage to the blade and the cost associated with turbine down-time during blade replacement.

In general, lightning protection systems for wind turbine rotor blades are known. In one example, an electrically conductive lightning receptor element is arranged on an outer surface of the blade to receive a lightning strike. Since the receptor element is electrically conductive, lightning is more likely to attach to the receptor element in preference to the relatively non-conductive material of the blade. The receptor element is connected to a cable or 'down conductor' that extends inside the blade to the root and from there connects via an armature arrangement to a charge transfer route in the hub, nacelle and tower to a ground potential. Such a lightning protection system therefore allows lightning to be channelled from the blade to a ground potential safely, thereby minimising the risk of damage.

A receptor arrangement as described above provides discrete conductive points to which lightning may attach. For example, in WO 2015/055214 A1, a wind turbine rotor blade having a tip receptor arrangement is described. The receptor arrangement includes individual receptor bases that are connected to a down conductor within the rotor blade and connected to an external surface of the blade by receptor elements that extend through the rotor blade shell. When lightning strikes the rotor blade surface, the charge is transferred to the down conductor via the receptor elements and receptor bases.

According to WO 2015/055214 A1, the receptor elements must be installed after the blade has been manufactured with the receptor arrangement in place. One of the problems associated with this method of fabricating the blade is that the positioning of each receptor base relative to an external surface of the blade is very critical. To facilitate installation of the receptor elements, a plurality of holes are drilled through each side of the blade shell and through the receptor bases. Standardised receptor elements are then inserted into each hole to form an electrical connection between the surface of the blade and one of the receptor bases. If the receptor bases are not disposed centrally within the blade shell, then it is possible that the receptor elements may not connect correctly with the receptor bases, meaning that no or an unsatisfactory electrical connection may be formed between the receptor elements and the receptor bases.

It is an object of the invention to provide an improved rotor blade for a wind turbine that facilitates the desired connection between receptor elements and bases.

SUMMARY OF THE INVENTION

According to the invention, this object is achieved by providing a rotor blade for a wind turbine comprising: an internal blade cavity defined by two opposing internal surfaces of two shells of the rotor blade; a receptor block forming part of a lightning protection system and disposed within the internal blade cavity; and a centralising device that spaces the receptor block from the two opposing internal surfaces of the shells such that the receptor block lies centrally within the internal blade cavity.

The receptor blocks lie centrally within the internal blade cavity with respect to an airfoil thickness direction. The airfoil thickness direction can be considered as the direction perpendicular to both the plane formed between the leading and trailing edges and the plane formed between the root end and tip end of the blade.

The provision of a centralising device ensures that the receptor block is maintained centrally within the cavity of the blade, and thus, centrally with respect to the surface of each blade. Therefore, when a hole is drilled through the blade for placing a conducting bolt into, the receptor block will be held in a predictable position because of the centralising device. The conducting bolt will be able to form a satisfactory electrical connection with the receptor block.

Furthermore, incorporating a centralising device that spaces the block from each of the opposing internal surfaces rather than merely a single surface allows for a standardised receptor block that is applicable to many different internal blade cavities and does not have to be redesigned for different blade designs.

Preferably, the centralising device may be compressible between an uncompressed state, prior to disposition of the receptor block in the cavity and a compressed state when the receptor block is disposed in the cavity.

The compressibility of the centralising device further improves its applicability to different blade designs. During application, the centralising device adapts to the cavity in which it is disposed.

The centralising device may be made of a foam compound. Compressible materials like foam compounds are particularly useful for achieving the desired effect and for effectively maintaining the receptor block centrally within the cavity.

The centralising device may be elastically deformable. The centralising device may be elastically deformable by being manufactured from an elastically deformable material or by having a structure that is capable of elastic deformation.

The centralising device may have an outer perimeter that is configured to be in contact with the opposing internal surfaces of the shells. The outer perimeter may have a substantially circular profile in the uncompressed state.

A centralising device with a circular profile is beneficial as it may be used for centralising the block in a variety of differing cavities, regardless of where the contact between the centralising device and the shell is made.

The receptor block may be electrically connected to a down conductor. The centralising device may have an outer perimeter that surrounds the down conductor.

In surrounding the down conductor, the centralising device is able to centralise the block relative to any surface of the cavity within which it is disposed. Surrounding the down conductor also provides additional protection of the down conductor.

The down conductor may also be centralised by the centralising devices. Beneficially, the centralised down conductor will be held at the neutral axis of the blade, and so longitudinal stresses and strains experienced by the down conductor when the blade bends in operation are reduced compared to a down conductor located on a surface of one of the shells.

The down conductor and receptor block may be at least partially encapsulated within an electrically insulative casing. The centralising device may be disposed on the electrically insulative housing that encapsulates the down conductor.

The receptor block may be fixed to the shell by an adhesive.

The rotor blade may comprise a positioning mechanism on one of the internal opposing faces of the shells to maintain the receptor block in a desired position during assembly of the rotor blade.

It is particularly important to ensure that a receptor block does not change position after it has been carefully arranged on the shell surface. A positioning mechanism makes sure that this does not happen.

The positioning mechanism may comprise a bracket for mounting the receptor block to one of the shells. The bracket may be configured to restrict translational movement of the receptor block in two planes.

Restriction of movement in two planes beneficially means that the receptor block may only move in the direction in which it is required to be centralised, reducing the likelihood of problems during the joining process.

The rotor blade may comprise a plurality of receptor blocks mounted to a down conductor to form a receptor array. The rotor blade may comprise a plurality of centralising devices that space the receptor blocks of the receptor array from the two opposing internal surfaces of the shells such that the receptor block lies centrally within the internal blade cavity.

At least two of the plurality centralising devices may be arranged on the receptor array between consecutive receptor blocks.

The step of joining the two shells may comprise compressing the centralising device therebetween.

Preferably, the centralising device undergoes elastic deformation throughout the compression. Advantageously, a centralising device that is able to undergo elastic deformation as opposed to plastic deformation during the compression can be used to centralise the receptor block a number of times, should re-joining or re-centralising be required.

The centralising device may be manufactured from an elastic, compressible material.

According to an aspect of the invention, there is provided a wind turbine comprising a rotor blade as described above According to an aspect of the invention, there is provided a method of mounting a receptor block to a rotor blade for a wind turbine, the rotor blade comprising two moulded shells, the method comprising the steps of: mounting at least one centralising device to a receptor block of a lightning protection system to form a receptor assembly; arranging the receptor assembly on an internal surface of one shell of the rotor blade; and joining the two shells together so as to enclose the receptor assembly within an internal blade cavity defined by two opposing internal surfaces of the shells, wherein: the centralising device spaces the receptor block from the two opposing internal surfaces of the shells such that the receptor block lies centrally within the internal blade cavity.

The method may comprise applying adhesive to the receptor assembly.

Within the scope of this application it is expressly intended that the various aspects, embodiments, examples and alternatives set out in the preceding paragraphs, in the claims and/or in the following description and drawings, and in particular the individual features thereof, may be taken independently or in combination.

BRIEF DESCRIPTION OF THE DRAWINGS

One or more embodiments of the invention will now be described, by way of example only, with reference to the accompanying drawings, in which.

DETAILED DESCRIPTION

Figure 1:
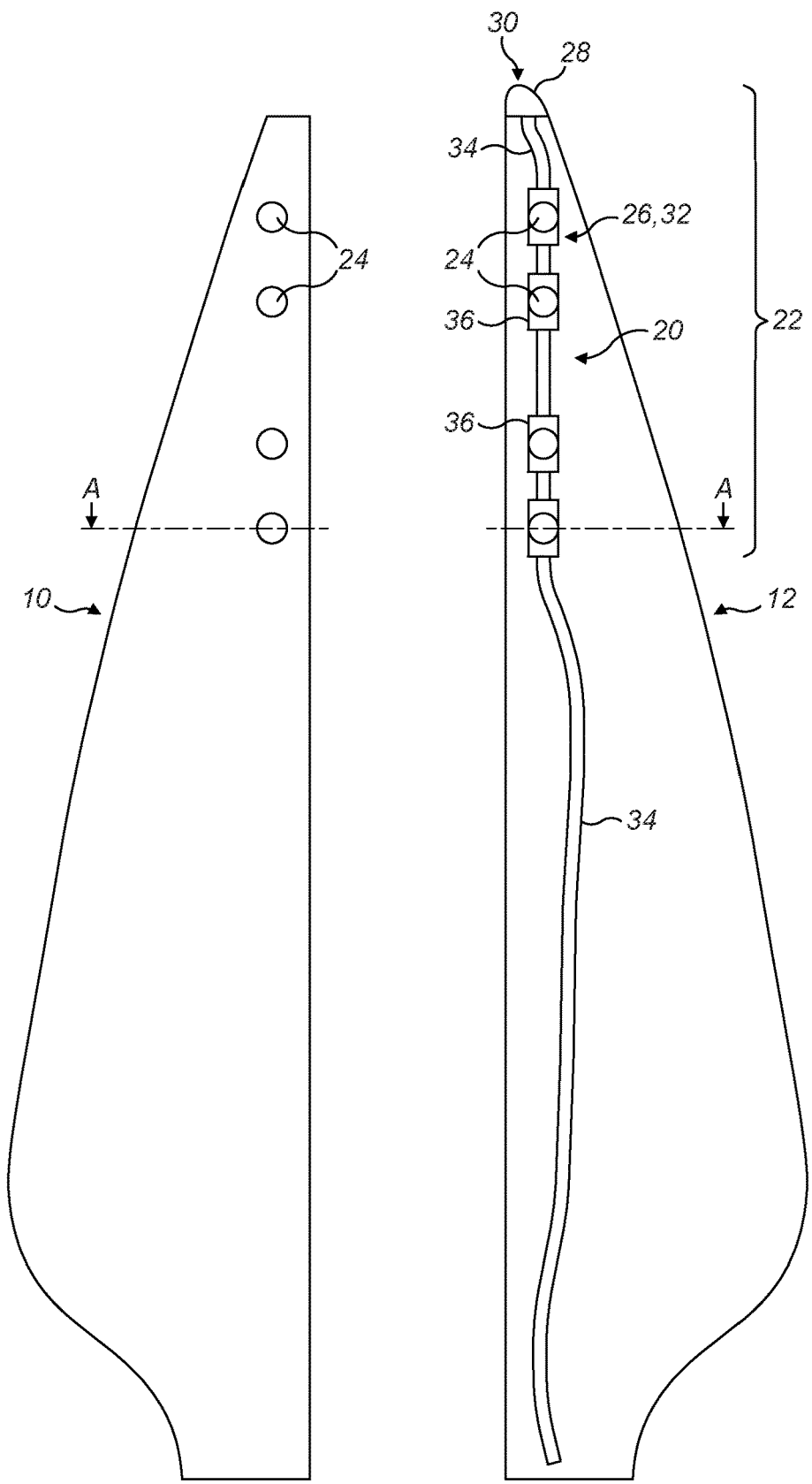
FIG. 1 is a schematic, plan view of leeward and windward wind turbine rotor blade half-shells including a receptor assembly according to an embodiment of the invention.

FIG. 1 schematically shows a leeward and a windward shell 10, 12 of a rotor blade. Rotor blades for wind turbines are usually manufactured using separate moulds for each shell 10, 12 of the blade. In these moulds, the rotor blade is built up layer by layer and additional items or units may be added to the shell surface. When both shells 10, 12 are completed, they are taken out of their moulds and joined together to form a full rotor blade. The internal surfaces of the shells 10, 12 are moulded so that, once the shells 10, 12 are joined to form the full rotor blade, and the internal surfaces of each shell 10, 12 oppose one another, an internal cavity is formed in the blade. The cavity extends along the length of the blade, and is typically used for housing systems that are used to monitor the operation of the blade and to protect the blade during extreme environmental conditions.

A particular example of one system that is housed in the internal blade cavity is a lighting protection system. Lightning protection systems are an important aspect of a rotor blade and are added onto or integrated into the rotor blade surfaces during manufacture. FIG. 1 schematically shows an example of a lightning protection system 20, which dissipates electrical energy of lightning that strikes a distal region 22 of the rotor blade, close to a tip of the rotor blade, to a ground potential. The system 20 acts to safely discharge the energy from the lightning to the ground potential through down conductors that extend within the blade, nacelle and tower of the wind turbine.

The lightning protection system 20 comprises a plurality of receptors 24 for conducting lightning striking the surface of the rotor blade, towards a receptor assembly 26. The receptors 24 may, for example, comprise conducting bolts. The receptor assembly 26 is disposed within the internal blade cavity for receiving electrical energy from the receptors 24 and for discharging the energy away from the distal or tip region 22 of the wind turbine. The receptors 24 can be considered to perform the function of forming an electrical connection between the exterior and interior of the rotor blade to allow for the discharge of the lightning strike. The receptor assembly 26 performs the function of receiving the lightning strike and directing it to other down conductors for discharge at a ground potential.

As can be seen in FIG. 1, at one end the receptor assembly 26 connects to a solid metal tip 28 of the rotor blade by a tip connector (not shown in FIG. 1). The solid metal tip 28 conducts direct lightning strikes on the distal end 30 of the rotor blade to the receptor assembly 26 via the tip connector for eventual discharge to a ground potential.

The receptor assembly 26 further comprises a down conductor 34 as well as a plurality of receptor blocks 36 connected to the down conductor along its length. The plurality of receptor blocks 36 arranged along the length of the down conductor 34 may be considered to form a receptor array 32. The receptor blocks 36 are electrically conductive masses, typically manufactured from a conductive metal, that provide a point of interconnection between the receptors 24 and the down conductor 34. As such, the receptor blocks 36 are positioned along the down conductor 34 at specific points so as to receive the receptors 24 that pass through the blade shells 10, 12. While a plurality of receptor blocks 36 is depicted here, it will be appreciated that the lightning protection system 20 may similarly function with a single receptor block 36.

To form the connection between the down conductor 34 and the external surface of the blade, the receptor assembly 26 is fixed in place within the cavity and the receptors 24 are placed into holes drilled at specific positions on one of the blade shells 10, 12. The receptors 24 connect to the down conductor 34 via their respective receptor block 36, through which the down conductor 34 passes, or to which the down conductor 34 is electrically and robustly connected.

Figure 2:
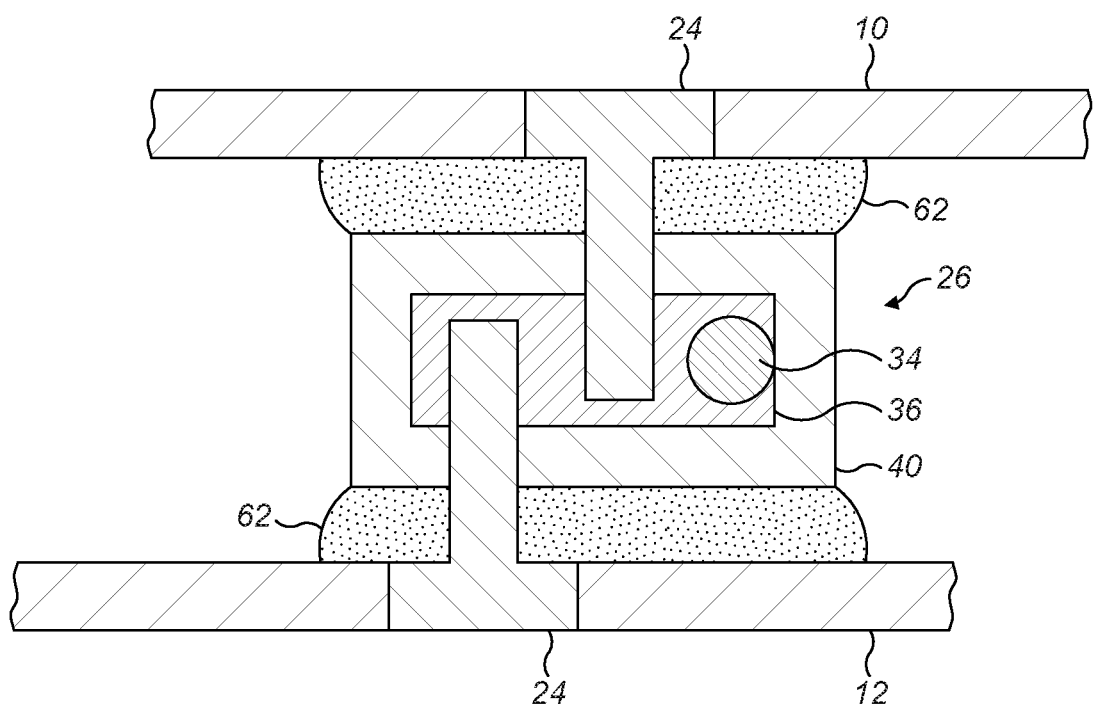
FIG. 2 is a schematic cross section of a rotor blade incorporating a receptor assembly.

FIG. 2 shows a cross-section of a rotor blade incorporating a receptor assembly 26. The cross-section may be taken, for example, along the line A-A as shown in FIG. 1. The receptor block 36, the down conductor 34 and receptors 24 in the form of conducting bolts are all shown in FIG. 2 between the leeward and windward shells 10, 12. Also shown are an insulative casing 40 surrounding the down conductor 34 and receptor block 36 and an adhesive 62 that bonds the receptor block 36 to the internal surfaces of the shells 10, 12. The casing 40 will be discussed in more detail below in relation to FIGS. 3 and 4, and the adhesive 62 will be discussed in relation to FIGS. 5 and 6.

As shown in FIGS. 1 and 2, each receptor block 36 receives two receptors 24; one receptor 24 from the external surface formed by the leeward shell 10 and one receptor 24 placed through a hole in the windward shell 12. Because of this dual-sided application of the lightning protection system 20, it is important that the blocks 36 at least are correctly positioned within the cavity to facilitate a correct connection between the receptor block 36 and the receptors 24, as will now be explained. It is also preferable that the down conductor 34 is centrally positioned within the cavity.

Figure 3:
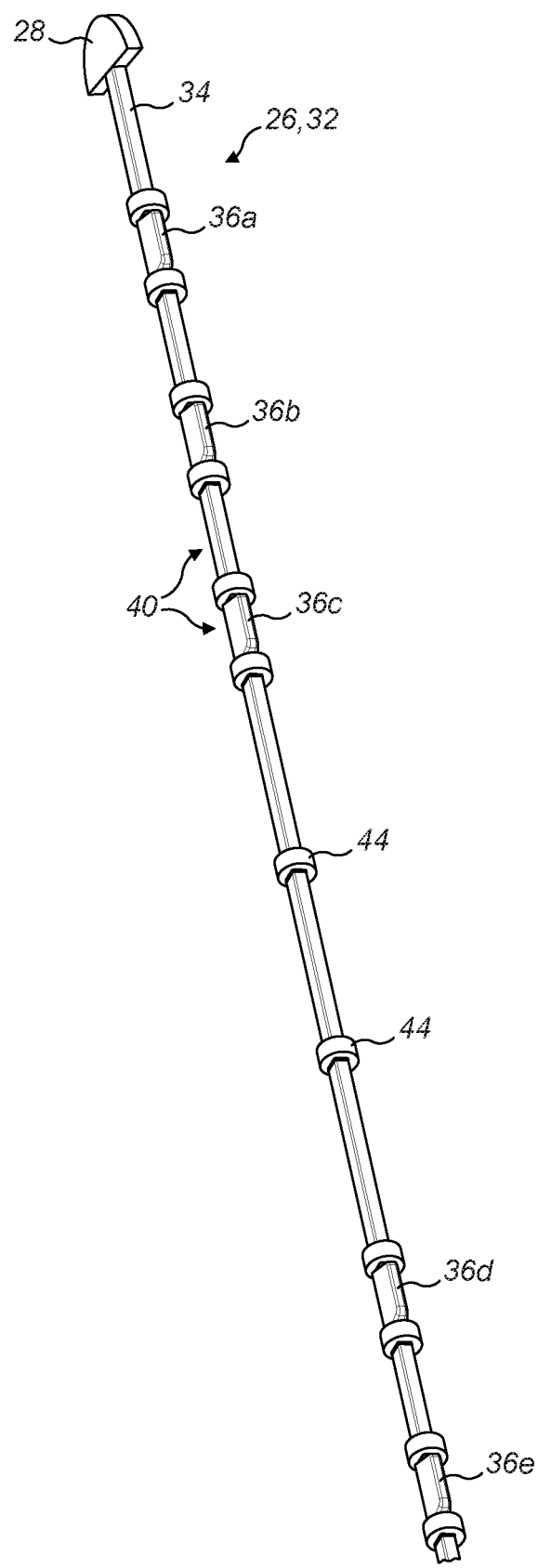
FIG. 3 is a perspective view of the receptor assembly of FIG. 1.

A perspective representation of a receptor assembly 26 is shown in FIG. 3, including the tip receptor 28, down conductor 34 and plurality of receptor blocks 36. An insulative casing 40 is also shown that surrounds both the down conductor 34 and the receptor blocks 36. By incorporating this insulative casing 40, electricity conducted by the assembly 26 is confined to the lightning protection system 20 only because the conductive components are encapsulated within an electrical insulator. When a lightning strike is conducted to a receptor block 36, and through the block 36 to the down conductor 34, the insulative casing 40 prevents arcing between the receptor assembly and any conductive components in the blade. This is important to prevent any transfer of electrical energy from the lightning protection system 20 to the blade or other systems within the blade. Damage to the blade and/or systems within the blade is therefore avoided.

Figure 4:
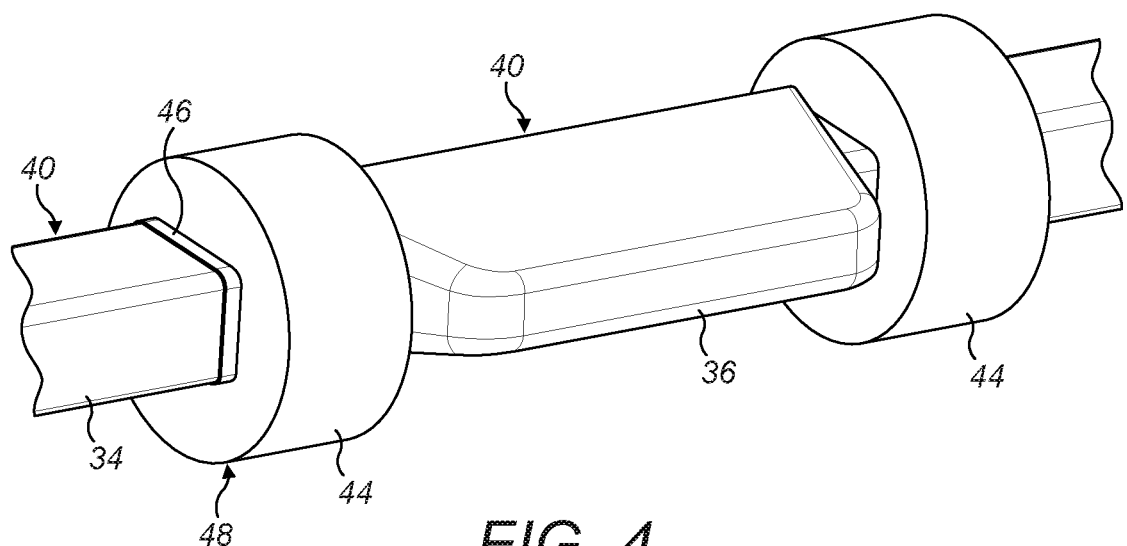
FIG. 4 is a perspective, close-up view of a portion of the receptor assembly of FIG. 3.

FIG. 4 shows an enlarged part of the receptor assembly 26 of FIG. 3. Considering FIG. 4 as well as FIG. 3, the receptor assembly 26 also comprises a plurality of centralising devices 44. The centralising devices 44 centralise at least the receptor blocks 36 within the internal blade cavity during and following manufacture in the direction of joining of the shells 10, 12, spacing the receptor blocks 36 from the opposing internal surfaces of the shells 10, 12 to allow the receptor blocks 36 to lie centrally within the cavity. In other words, the centralising devices 44 passively bias the receptor blocks 36 from each surface within the cavity once the shells 10, 12 of the rotor blade have been joined to form the blade, and maintain the receptor blocks 36 in a central position until the blocks have been fixed in this central position by an adhesive or other fixing means. In doing so, it is ensured that the receptor blocks 36 are correctly positioned within the cavity so that a hole can be drilled from the external surfaces of each shell 10, 12 through a block 36 for a standard receptor 24 to be inserted and an optimal connection formed between the receptor 24 and the receptor block 36. As the block 36 is centralised and subsequently fixed, there is no movement of the block 36 during drilling or installation of the receptors 24. Furthermore, the centralising devices 44 act to account for variation in the internal cavity of the blade by virtue of their shape and material.

The centralising of the blocks 36 takes place in an airfoil thickness direction, which is a direction perpendicular to the airfoil chord that is formed between a leading and trailing edge of the rotor blade.

To achieve the centralising of the receptor blocks 36, the centralising devices 44 compress from an uncompressed state, prior to joining the shells 10, 12, and a compressed state when the shells 10, 12 are joined. The compressibility of the centralising devices 44 passively biases the blocks 36 centrally within the cavity until the blocks 36 have been fixed in place within the cavity ready for the holes to be drilled and the receptors 24 connected to the down conductor 34 via the receptor blocks 36.

As can be seen in FIG. 4, each centralising device 44 comprises a substantially annular disc arranged to entirely surround the insulative casing 40 of the down conductor 34. Each centralising device 44 has a radius that extends radially outwardly from the down conductor 34. A central cut-out portion 46 of the annular disc is shaped to conform with the external shape of the down conductor 34 casing around which the centralising device 44 sits. The central cut-out portion 46 is dimensioned to be of a substantially similar size to the size of the casing 40, so that the centralising device 44 fits tightly to the casing 40 and does not move relative to the receptor block 36 during positioning and installation. A centralising device 44 that fits tightly around the casing 40 will not need fixing to the casing 40, although in some embodiments a suitable adhesive or other fixing means may be used to firmly secure the centralising devices 44 to the casing 40 at the correct position.

Each centralising device 44 has an outer perimeter 48 having, in this example, a circular profile in a direction that is radially outwardly from an axis defined by the down conductor 34. In other words, the radius of the circle forming the outer perimeter 48 of the centralising device 44 surrounds the down conductor 34 and is at a substantially identical distance from the down conductor 34 at all points on the perimeter 48 of the centralising device 44. Each centralising device 44 also has substantially flat outer edges bordering the outer perimeter, such that the annulus is substantially cylindrical except for the cut-out portion 46 through which the down conductor 34 and its casing 40 pass.

The centralising devices 44 are manufactured from a foam compound, or from another suitably compressible material, to allow them to perform their purpose by compressing to account for the change in volume within the cavity due to the joining of the blade shells. For example, polyurethane foams may be used to manufacture the centralising devices. Polyurethane foams are typically able to resist and withstand long term loading without significant structural degradation. Polyurethane foams tend to exhibit viscoelastic properties, recovering well upon unloading. A stiffness modulus for such a foam would be in the range from 0.1 to 0.5 MPa.

In some embodiments, the centralising devices may be configured to have a compressible structure rather than being manufactured purely of a compressible material. For example, the centralising devices may comprise one or more springs, or a spring-like structure.

The centralising devices 44 preferably undergo elastic deformation throughout their compression by the shells 10, 12. Manufacturing the centralising devices 44 from a material that have a high resistance to plastic deformation, or manufacturing the structure of the centralising devices 44 to resist plastic deformation ensures that the centralising devices 44 can repeatedly centralise the blocks 36 effectively. Should the shells 10, 12 need to be separated and re-joined, devices that have plastically deformed would not be able to perform the centralising function once more.

Furthermore, it is preferable to manufacture the centralising devices 44 from a material that does not compress under the weight of the blocks 36 during manufacture, or from a material whose compression under the weight of the blocks 36 is negligible when compared to the compression required for centralisation. A significant compression of the centralising devices 44 under the weight of the blocks 36 would result in the blocks 36 being displaced and incorrectly centralised.

An ideal range of stiffnesses of the material therefore exists in which the centralising devices 44 are both able to support the receptor blocks 36 and down conductor 34 without compressing due to their weight; and are also able to compress during fabrication of the blade such that the force exerted by the centralising devices 44 on the shells 10, 12 does not cause problems during fabrication or use of the blade, such as separation of the shells 10, 12 or damage to the laminate structure of the shells 10, 12.

The centralising devices 44 will preferably undergo elastic deformation when they are compressed. Sometimes when manufacturing a blade, the shells 10, 12 will be joined and may subsequently have to separated. If the devices 44 have undergone plastic deformation they would not be able to be reused in the subsequent joining of the shells 10, 12.

It is also preferable that the material is also able to be used in tandem with an adhesive or other fixing mechanism without degrading so that the centralising devices are able to continually perform their function throughout the manufacturing process until the receptor blocks 36 have been bonded to the internal surfaces of the blade cavity in the correct way.

By utilising compressible centralising devices 44, the central positioning of the receptor blocks 36 is achieved relative to the internal surface of the shells 10, 12. Put another way, the centralising devices 44 maintain the receptor blocks 36 at an equal distance from each internal surface of each blade shell 10, 12, and in doing so optimally centralise the blocks 36. Centralising relative to internal opposed surfaces of the cavity accounts for the variations in blade shell thickness, which may vary along each shell 10, 12 and may vary between blades. The thickness of a shell 10, 12 varies due to the process of layering used to fabricate each shell 10, 12. Thus, the exact dimensions of the internal cavity are generally not accurately known until the shells 10, 12 are fully formed and joined together, and the use of cavity-specific centralising devices 44 is generally not possible. The use of compressible materials that are elastically deformable, as well as the use of a circular profile, ensures that the centralising devices 44 maintain the central position of the blocks 36 regardless of these variations.

Centralising relative to opposed internal surfaces also allows for blade curvature to be accounted for. Rotor blade shells 10, 12 are typically moulded so that the finished rotor blades include a curvature along their length as well as varying degrees of twisting. The internal cavity of the blade may therefore be relatively complex and the dimensions of the cavity may vary highly over short lengths of the blade. The compressibility of the centralising devices 44 facilitates their use in a large variety of differently dimensioned cavities.

To centralise both the receptor blocks 36 and the down conductor 34, the centralising devices 44 are also spaced along the length of the down conductor 34, being arranged immediately to either side of each receptor block 36, as well as at regular intervals between receptor blocks 36 where necessary. In some embodiments, the centralising devices 44 may be spaced to prioritise centralisation of the receptor blocks 36, to allow portions of the down conductor 34 to be fixed to a shell 10, 12.

For example, in the receptor assembly 26 illustrated in FIG. 3, each of the receptor blocks 36 are neighboured by centralising devices 44 positioned around the casing 40 of the down conductor 34 to either side of the receptor block 36. At least two centralising devices 44 are positioned between consecutive receptor blocks 36. However, as the length of down conductor 34 extending between the third receptor block 36c and the fourth receptor block 36d (assuming the first receptor block 36a is that closest to the tip receptor 28) is longer than the length of down conductor 34 extending between the first and second 36a, 36b, second and third 36b, 36c, and fourth and fifth 36d, 36e receptor blocks, two additional centralising devices 44 are positioned at regular intervals between the third and fourth receptor blocks 36c, 36d. Additional centralising devices 44 between the receptor blocks 36 aid in supporting and centralising the blocks 36 and down conductor 34 within the cavity.

It will be appreciated that FIGS. 3 and 4 are merely a representative example of how centralising devices 44 may be arranged relative to a plurality of receptor blocks 36 along a down conductor 34. In practice, the distance between centralising devices 44 and their proximity to receptor blocks 36 may be varied. The arrangement of centralising devices 44 may be dependent upon where the adhesive used to fix the receptor blocks 36 and/or down conductor 34 to the surface of the internal blade cavity is placed, as well as being dependent upon any other systems within the cavity. The use of adhesive to fix the blocks 36 and/or down conductor 34 to the surface and its interaction with the centralising devices 44 is discussed below with reference to FIGS. 5 and 6.

Figure 5:
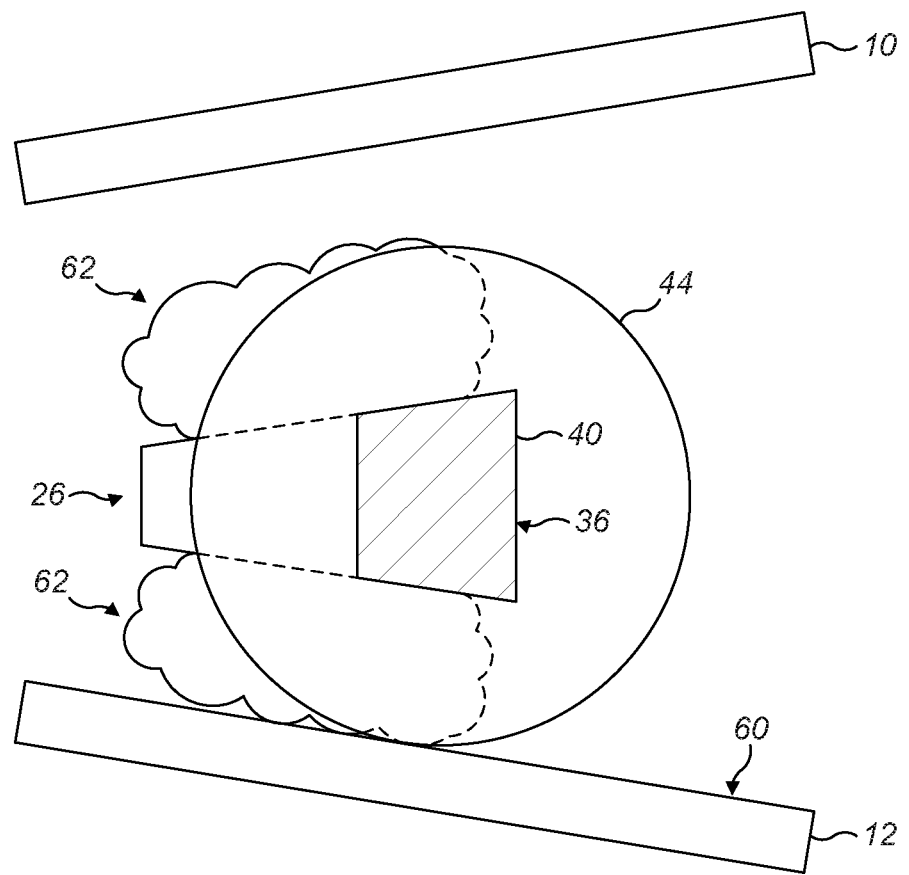
FIG. 5 is a schematic cross section of a wind turbine rotor blade during fabrication according the invention.
Figure 6:
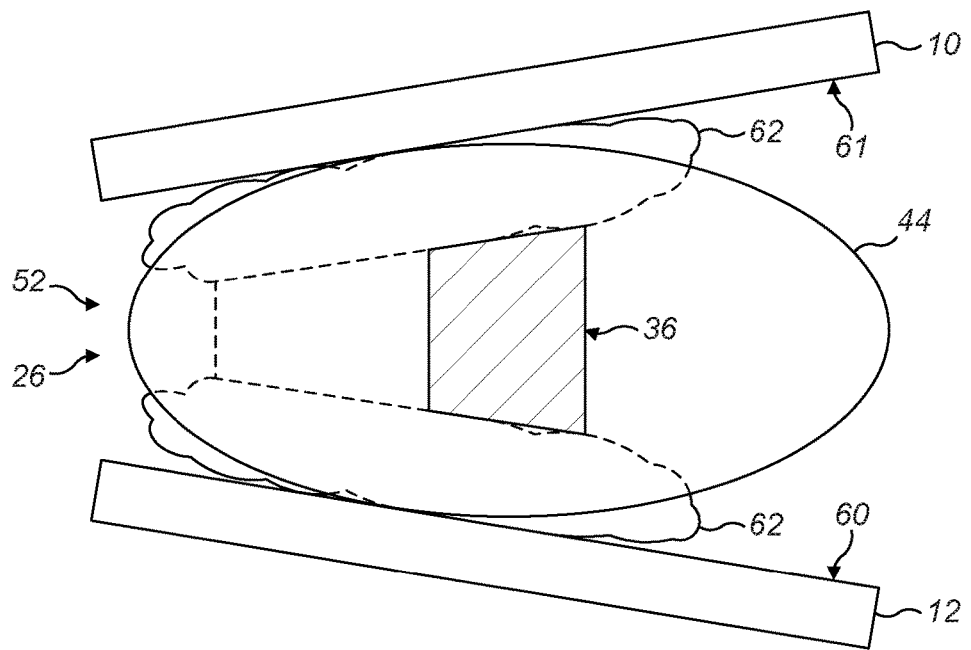
FIG. 6 is a schematic cross section of a wind turbine rotor blade following fabrication according the invention.

The manufacture of a wind turbine rotor blade including a lightning protection system 20 as described above will be discussed with reference to FIGS. 5 and 6. FIG. 5 shows a cross sectional portion of the rotor blade with the receptor assembly 26 prior to joining of the shells 10, 12 to form a rotor blade. In this Figure, the centralising devices 44 are in their uncompressed state. FIG. 6 shows the same cross section of the blade as illustrated in FIG. 5 except that in this situation, the shells 10, 12 have been joined together to fabricate the rotor blade, form the cavity 55, and compress the centralising devices 44 into the compressed state.

Initially, to install the lightning protection system 20, a receptor assembly 26 is provided by mounting a plurality of centralising devices 44 to at least one receptor block 36. The centralising devices 44 may be mounted to the receptor block 36 during manufacture of the block 36 or down conductor 34, or following their manufacture, depending upon the structure of the centralising devices 44. As discussed above, the centralising devices 44 may be fixed to the surface of the insulative casing 40 during this step to restrict movement of the centralising devices 44 from their intended positions.

Following provision of the receptor assembly 26, the receptor assembly 26 is arranged on one surface 60 of one of the shells 12. The surface is an internal surface 60 of the shell 12 that will partially define the internal blade cavity 55 when the blade has been fully formed.

To arrange the receptor assembly 26 in a desired position on a surface of a shell, a positioning system or device (not shown in FIG. 5 or 6) may be provided that indicates the desired position of at least one block 36 or of the down conductor 34 on a shell, or maintains at least one block 36 in the desired position. For example, outlines of one block 36 may be drawn on a surface of one shell, or projected by a laser guidance system. A further option, comprising the use of a bracket or a plurality of brackets for receiving each of the receptor blocks 36, will be discussed in relation to FIG. 7.

While the receptor assembly 26 is being arranged, the centralising devices 44 can be considered to be in an uncompressed state, retaining their circular outer profile or perimeter and supporting the down conductor 34 on the shell surface 60.

Having arranged the receptor assembly 26 in the desired position on the internal surface 60 of the shell 12, an adhesive 62 is applied to the receptor blocks 36 at least. The adhesive 62 may also be applied at predetermined positions along the length of the down conductor 34. The adhesive 62 secures the receptor blocks 36 in place following fabrication of the blade, so that their movement is restricted. It is envisaged that the adhesive 62 for securing the receptor blocks 36 to the blade shells 10, 12 will not be applied directly to the centralising devices 44 to avoid interference with their primary function.

The rotor blade is then formed by lowering one shell 10 on top of the other shell 12 and joining the two shells 10, 12 together. During this forming process, the centralising device 44 is compressed between the two internal surfaces 60, 61 of the shells 10, 12 as the internal cavity is formed. Once the rotor blade is formed, as shown in FIG. 6, each centralising device 44 adopts the compressed state, in which the centralising device 44 is compressed between the internal surfaces 60, 61 of the rotor blade that forms the internal blade cavity 55 and in which it adopts a compressed shape. As the outer profile of the centralising device 44 in the uncompressed state (FIG. 5) is circular, the outer profile compresses to adopt an oval shape in the compressed state. Other profiles of centralising devices 44 are also possible, as will be discussed below when considering alternative embodiments.

By utilising a circular outer profile, the plurality of centralising devices 44 required for an entire receptor assembly 26 are identical, and are not required to be designed differently to account for the changing internal profile of the internal blade cavity 55. The circular profile ensures that the centralising device 44 compresses symmetrically in the airfoil thickness direction in reaction to the pressure applied by the surfaces 60, 61 of the cavity 55, and that the centralising devices 44 can be compressed by a varying amount and still have the same effect regardless of the distance between the internal surfaces 60, 61 of the shells 10, 12 forming the cavity 55.

Similarly, the centralising devices used for one receptor assembly for a first blade may be identical to the centralising devices used for a second receptor assembly for a second blade and there is no necessity for blade-specific centralising devices due to their compressible and non-discriminatory nature.

Following the forming of the blade and transfer of the centralising devices 44 from the uncompressed state to the compressed state, the centralising device 44 can be considered to be maintaining the blocks 26 centrally within the cavity 55. The adhesive 62 that has been previously applied to the blocks 36 is then allowed to cure and bond the receptor blocks 36 to the internal surfaces 60, 62 of the shells 10, 12. As the centralising devices 44 are holding the blocks 36 centrally, the receptor assembly 26 is fixed within the cavity 55 at the desired position to allow the connections to be formed between the receptor blocks 36 and receptors 24 inserted through a bolt hole formed in the shell 10, 12.

The centralising devices 44 remain within the rotor blade during operation and perform additional functionality in doing so. For example, if the adhesive bond between the receptor blocks 36 and the shells 10, 12 were to degrade or break, the centralising devices 44 may act to maintain the blocks 36 in an operative position, and centrally within the cavity 55. Alternatively, the centralising device 44 may perform a cushioning or damping function to limit damage done to the blade internally due to an unsecured receptor assembly 26.

Figure 7:
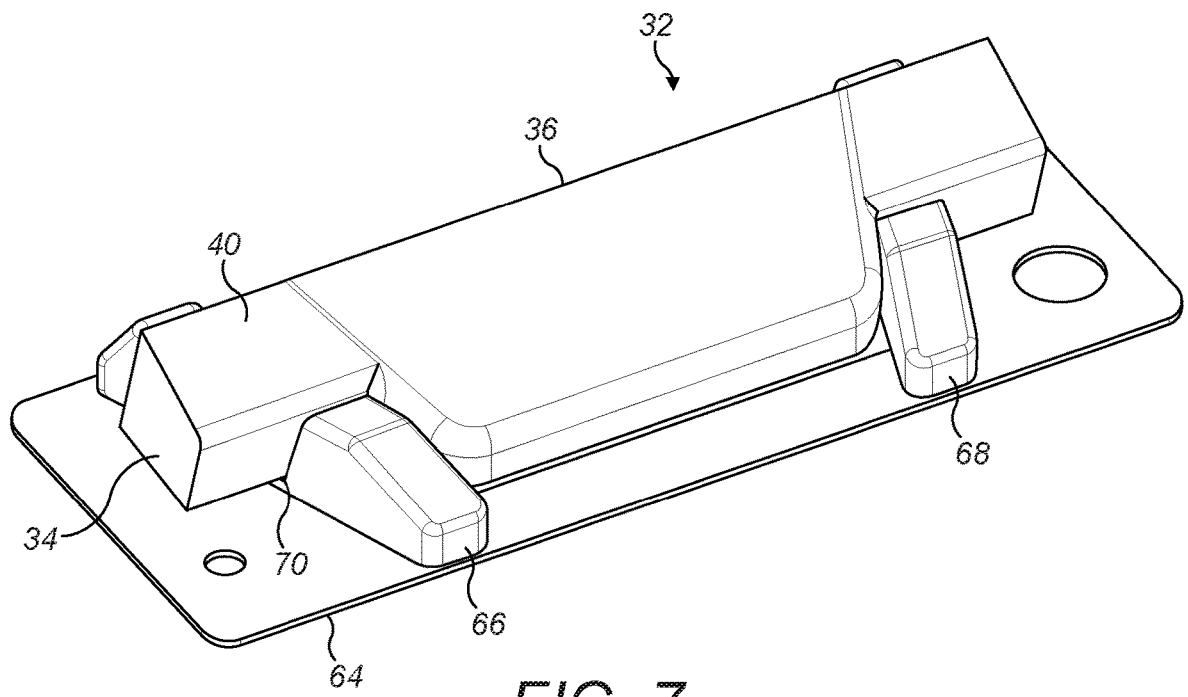
FIG. 7 is a perspective view of a receptor array and a mount of the lightning protection system shown in FIGS. 5 and 6.

The receptor assembly 26 may be arranged on an internal surface 60, 61 of a shell 10, 12 prior to bonding using at least one mount or bracket 64 such as those shown in FIG. 7. The bracket 64 is configured for receiving one of the receptor blocks 36 between two frames 66, 68. The frames 66, 68 support the receptor assembly 26 at the insulative casing 40 that surrounds the down conductor 34 either side of the receptor block 36, and allow the receptor block 36 to be accurately positioned on the blade surface.

The frames 66, 68 also provide a centralising benefit. Each frame 66, 68 incorporates a notch 70 for receiving a portion of the down conductor 34. The notch 70 is shaped so as to restrict or limit the rotational movement of the receptor assembly 26 relative to the blade surface and to restrict translational movement of the receptor assembly 26, and in particular each receptor block 36, in two planes. By restricting the movement of the receptor assembly 26 in this way, the frames 66, 68 ensure that the receptor assembly 26 does not shift from its desired positioning during the joining of the shells 10, 12, allowing only movement in the plane in which the receptor blocks 36 are being centralised. In other words, if the shells 10, 12 are joined by placing one shell on top of the other, as exemplified by FIGS. 5 and 6, the frames 66, 68, and by extension the brackets 64, allow translational movement of the receptor blocks 36 in the airfoil thickness direction only to provide centralising. The brackets restrict movement of the blocks 36, and the entire receptor assembly 26, in the direction of the leading or trailing edges of the blade or in the direction of the direction of the root or tip of the blade. During fabrication of the blade, the airfoil thickness direction corresponds to a vertical plane, with the leading/trailing edge direction corresponding to the lateral plane and the tip/root direction corresponding to the longitudinal plane.

When incorporating bracket 64, the method of blade fabrication above comprises the additional initial steps of positioning a plurality of brackets 64 on an internal shell surface 60, 61 at the position required for a receptor block 36, fixing the brackets 64 to the internal shell surface 60, 61 in this position, and aligning each receptor block 36 with a respective bracket 64 so that the receptor block 36 is positioned between the frames 66, 68 of its bracket 64.

In this situation, the centralising devices 44 may be mounted relative to the blocks 36 so that they lie beyond the extent of each bracket 64, thereby maintaining the central positioning of the receptor block 36 relative to the two internal shell surfaces 60, 61.

In this embodiment, both the bracket 64 and centralising devices 44 can be considered to aid in the centralising of the receptor blocks 36. In particular, it will be appreciated that the centralising devices 44 is able to ensure that the blocks 36 and down conductor 34 are centrally positioned, while the brackets 64, and more specifically the frames 66, 68 of the brackets 64, may be configured to hold the receptor blocks 36 at the correct rotational orientation relative to each of the internal surfaces 60, 61.

While a plurality of brackets 64 are discussed here, it will also be appreciated that a single bracket 64 may be used to position one of the receptor blocks 36 only.

A number of alternative embodiments exist as will now be discussed. For example, depending upon the type of blade being used and the profile of the internal cavity, the centralising devices used in the receptor assembly may be identical, or may vary in size or external profile according to their position on the receptor assembly. In some embodiments, each centralising device may have a substantially oval profile in the uncompressed state to allow for a greater compression in one direction. In this embodiment, the profile of the centralising device would be substantially circular in the compressed state.

In some embodiments, the centralising devices may comprise blocks of compressible material applied to each of two sides of the insulative casing that surrounds the receptor blocks and down conductor. The blocks may be shaped for contact with the internal surfaces of the shells.

The invention claimed is:

1. A rotor blade for a wind turbine comprising:
an internal blade cavity defined by two opposing internal surfaces of two shells of the rotor blade;
a receptor block forming part of a lightning protection system and disposed within the internal blade cavity; and
a centralising device that spaces the receptor block from the two opposing internal surfaces of the shells such that the receptor block lies centrally within the internal blade cavity,
wherein the centralising device is made of a foam compound and compressible between an uncompressed state prior to disposition of the receptor block in the cavity and a compressed state when the receptor block is disposed in the cavity, and
wherein the receptor block is electrically connected to a down conductor, the down conductor and receptor block being at least partially encapsulated within an electrically insulative casing, and the centralising device being disposed on the electrically insulative casing that encapsulates the down conductor.

2. The rotor blade of claim 1, wherein the centralising device is elastically deformable.

3. The rotor blade of claim 1, wherein the centralising device has an outer perimeter that is configured to be in contact with the opposing internal surfaces of the shells, in use, and that has a circular profile in the uncompressed state.

4. The rotor blade of claim 1, wherein the receptor block is electrically connected to a down conductor, and wherein the centralising device has an outer perimeter that surrounds the down conductor.

5. The rotor blade of claim 1, wherein the receptor block is fixed to one of the shells by an adhesive.

6. The rotor blade of claim 1, further comprising a positioning mechanism on one of the internal opposing faces of the shells to maintain the receptor block in a desired position during assembly of the rotor blade.

7. The rotor blade of claim 6, wherein the positioning mechanism comprises a bracket for mounting the receptor block to one of the shells, the bracket being configured to restrict translational movement of the receptor block in two planes.

8. The rotor blade of claim 1, comprising a plurality of receptor blocks mounted to a down conductor to form a receptor array and a plurality of centralising devices that space the plurality of receptor blocks of the receptor array from the two opposing internal surfaces of the shells such that the plurality of receptor blocks lie centrally within the internal blade cavity.

9. The rotor blade of claim 8, wherein at least two of the plurality centralising devices are arranged on the receptor array between consecutive receptor blocks.

10. A wind turbine comprising the rotor blade of claim 1.

11. A method of mounting a receptor block to a rotor blade for a wind turbine, the rotor blade comprising two moulded shells that define two opposing internal surfaces, the method comprising the steps of:
mounting at least one centralising device to the receptor block of a lightning protection system to form a receptor assembly, the at least one centralising device comprising a foam compound and having a compressed state and an uncompressed state;
arranging the receptor assembly on one of the two opposing internal surfaces of the shells of the rotor blade;
joining the two shells together so as to enclose the receptor assembly within an internal blade cavity defined by the two opposing internal surfaces of the shells; and
electrically connecting the receptor block to a down conductor, wherein:
the centralising device spaces the receptor block from the two opposing internal surfaces of the shells such that the receptor block lies centrally within the internal blade cavity, and
wherein the down conductor and receptor block are at least partially encapsulated within an electrically insulative casing, and the centralising device is disposed on the electrically insulative casing that encapsulates the down conductor.

12. The method of claim 11, comprising applying adhesive to the receptor assembly.

13. The method of claim 11, wherein the step of joining the two shells comprises compressing the centralising device therebetween.

14. The method of claim 13, wherein the centralising device undergoes elastic deformation throughout the compression.

15. The method of claim 13, wherein the centralising device does not plastically deform throughout the compression.

16. The method of claim 11, wherein the centralising device is manufactured from an elastic, compressible material.

* * * * *